(12) United States Patent
Lichter et al.

(10) Patent No.: US 11,491,920 B2
(45) Date of Patent: Nov. 8, 2022

(54) REAR MODULE FOR A MOTOR VEHICLE, AND A MOTOR VEHICLE HAVING A REAR MODULE

(71) Applicant: Ford Global Technologies, LLC, Dearborn, MI (US)

(72) Inventors: Martin Lichter, Erftstadt (DE); Hauke Weber, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 186 days.

(21) Appl. No.: 16/919,355

(22) Filed: Jul. 2, 2020

(65) Prior Publication Data
US 2021/0009045 A1 Jan. 14, 2021

(30) Foreign Application Priority Data

Jul. 8, 2019 (DE) .......................... 102019209982.3

(51) Int. Cl.
*B60R 9/06* (2006.01)
*B60J 5/10* (2006.01)

(52) U.S. Cl.
CPC ............... *B60R 9/065* (2013.01); *B60J 5/107* (2013.01); *E05Y 2900/546* (2013.01)

(58) Field of Classification Search
CPC .... B60R 9/065; B60J 5/107; E05Y 2900/546; B62D 25/10
See application file for complete search history.

(56) References Cited

U.S. PATENT DOCUMENTS

| 3,451,710 A | 6/1969 | Savell |
| 3,454,299 A | 7/1969 | Hewitt et al. |
| 5,468,114 A | 11/1995 | Hickerson |
| 5,685,594 A | 11/1997 | Harper |

FOREIGN PATENT DOCUMENTS

| DE | 3915387 | 11/1989 | |
| DE | 20301275 | 3/2003 | |
| DE | 10156893 | 5/2003 | |
| DE | 102006057859 | 6/2008 | |
| DE | 102006059985 | 6/2008 | |
| DE | 102007015965 | 10/2008 | |
| DE | 102007024953 | 12/2008 | |
| DE | 112008002722 | 12/2012 | |
| EP | 3741597 A1 * | 11/2020 | ............... B60R 5/04 |

OTHER PUBLICATIONS

German Search Report for application No. 102019209982.3 dated Mar. 11, 2020.

* cited by examiner

*Primary Examiner* — D Glenn Dayoan
*Assistant Examiner* — Melissa Ann Bonifazi
(74) *Attorney, Agent, or Firm* — Vichit Chea; Carlson, Gaskey & Olds, P.C.

(57) ABSTRACT

A rear module can include a tailgate configured to pivot about a pivot axis that extends transversely with respect to the vehicle longitudinal direction, and a frame element that extends transversely with respect to the vehicle longitudinal direction and is integrated into the tailgate. The frame element has a first fastening assembly at its respective ends. The first fastening assembly being set up to selectively lock the rear module in a closed state of the tailgate together with second fastening assembly which are configured on the rear-side vehicle body. A motor vehicle can have such a rear module.

18 Claims, 3 Drawing Sheets

REAR MODULE FOR A MOTOR VEHICLE, AND A MOTOR VEHICLE HAVING A REAR MODULE

CROSS-REFERENCE TO RELATED APPLICATIONS

This application claims priority to DE Patent Application No. 102019209982.3, which was filed on 8 Jul. 2019 and is incorporated herein by reference in its entirety.

TECHNICAL FIELD

The disclosure relates to a rear module for a motor vehicle. Furthermore, the disclosure relates to a motor vehicle which has such a rear module.

BACKGROUND

In general, motor vehicles have a loading opening on their rear side, via which loading opening cargo can be loaded into and unloaded from a trunk region of the motor vehicle. The loading opening can extend almost over the entire region of the vehicle rear and can be closed by way of a tailgate. To move a tailgate of this type from a closed position into an open position and vice versa, the tailgate can be mounted pivotably on the vehicle. Furthermore, a locking mechanism can be configured between the tailgate and the rear region of the motor vehicle, by means of which the tailgate can be locked and closed securely. To this end, a corresponding locking element is as a rule provided both on the tailgate and on the vehicle body, the two locking elements interacting in the closed position of the tailgate and providing the closure mechanism. Tailgates can fundamentally be of single-piece or multiple-piece configuration.

In their rear region, many vehicle types have a trunk which is accessible via the rear opening. Here, the trunk floor is as a rule arranged at a higher vertical level than the vehicle undertray. An additional stowage space, for example for storing a spare tire, is frequently provided between the trunk floor which provides the actual loading surface and the vehicle undertray. Even in that case where no spare tire is stored in the intermediate space which is provided between the vehicle undertray and the trunk floor and the intermediate space is therefore in principle available for storing cargo, the use of said additional gained space as stowage space is rather unsuitable in the case of everyday loading and unloading operations. This is even more the case for relatively heavy loads. This is since the intermediate space which lies between the vehicle undertray and the trunk floor is delimited in the vehicle rear region by a positionally fixed bumper and/or a vehicle trim panel. This means that a load (for example, a luggage item) must be conveyed (for example, lifted) over the bumper and/or the vehicle trim panel for positioning in the intermediate space, to pass to the vertical level of the intermediate space, which vertical level is lower in relation to the upper side of the bumper. This appears impracticable for luggage items of a relatively high weight, for which reason the stowage space which lies below the trunk floor is as a rule not utilized for routine loading and unloading operations of the motor vehicle.

The bumper which is installed as standard in the rear region of vehicles or the lower part of the vehicle body which surrounds the rear opening is as a rule integrated in one piece into a rear frame which delimits the vehicle rear opening, and is therefore to be assigned directly to the vehicle body.

SUMMARY

A rear module for a vehicle includes a tailgate which is configured such that it can be pivoted about a pivot axis which extends transversely with respect to the vehicle longitudinal direction, and a frame element which extends transversely with respect to the vehicle longitudinal direction and is integrated into the tailgate. The frame element has a first fastening assembly at its respective ends, and the first fastening assembly being set up to selectively lock the rear module in a closed state of the tailgate, together with second fastening assembly which are configured on the rear-side vehicle body.

By providing such a rear module for a motor vehicle, the rear-side loading of a motor vehicle can be carried out in a more comfortable and rapid manner, and the stowage space which is accessible for loading a motor vehicle is increased in size. Furthermore, both rapid opening and closing of the rear module and secure locking thereof can be ensured. Furthermore, the disclosure provides a motor vehicle, in which the rear-side loading of a motor vehicle can be carried out in a more comfortable and rapid manner, and the stowage space which is accessible for loading the motor vehicle is increased in size. The motor vehicle is also to ensure both rapid opening and closing of the rear assembly and secure locking of the rear assembly.

The rear module according to exemplary embodiments of the present disclosure can fundamentally be installed in motor vehicles with different rear shapes, regardless of whether said vehicle is a notchback, a fastback or a hatchback. The shape of the rear is dependent on the respective vehicle type.

Notchbacks are to be found in most vehicles above the compact class. In the case of motor vehicles with a notchback of this type, the trunk can be set apart from the passenger compartment and form a step toward the vehicle top. A bulkhead or a cross brace below the C-pillars stiffens the self-supporting body. In the case of vehicles with a notchback, a three-box design is spoken of, inter alia, in the case of which the front, the passenger compartment and the rear are in each case like a box.

In SUV vehicles, a fastback is as a rule provided. In the case of a fastback, the rear drops directly behind the first or second seat row of the passenger compartment with an approximately constant gradient from the vehicle top as far as the rear termination of the vehicle body. In contrast to this, hatchbacks have an almost perpendicularly running rear surface.

The vehicle body (which can also synonymously be called a vehicle frame) can help to absorb, for example, impact loads. Furthermore, the vehicle body can be used to dissipate vibrations of the vehicle engine, to minimize comfort impairments in the passenger compartment. Here, vehicle bodies which are completely closed and/or manufactured in one piece with profiles which are as round as possible have particularly high stiffness values.

In relation to the vehicle rear region, in the case of motor vehicles with a fastback or hatchback, vehicle rear regions have provided a rear-side vehicle frame that delimits a trunk opening or loading opening which can be closed by way of a tailgate. A rear-side vehicle frame of this type is as a rule manufactured in one piece and forms one part of the vehicle body.

At the same time, a vehicle frame of this type defines the approximate vertical position of the trunk floor by way of its lower frame side. An additional stowage space (for example, for a spare tire, first aid kit, vehicle tools, etc.) is provided below the trunk floor in the case of many vehicles. The stowage space is therefore arranged in an intermediate space between the trunk floor and the vehicle undertray. Because of the higher vertical level of the lower frame side, the intermediate space can sometimes be unsuitable for loading heavy luggage items. This is because the luggage item needs to be lifted over the lower frame side of the rear-side vehicle frame for loading or unloading a luggage item into/from the said intermediate space, which can be difficult for a person who is loading or unloading the luggage item. Furthermore, the performance of a lifting movement of this type is uncomfortable. Due to the lifting movement which is to be carried out over the lower frame side, heavy or cumbersome loads may be particularly to load or unload them from/into the intermediate space. This problem is addressed by exemplary embodiments of the present disclosure.

As has already been mentioned, the rear module according to the exemplary embodiments of the present disclosure includes a tailgate that is configured such that it can be pivoted about a pivot axis which extends transversely with respect to the vehicle longitudinal direction. Here, the specific shape of the tailgate is not fixed. The tailgate can thus be the sole tailgate which delimits the trunk, a tailgate which is provided in addition to a trunk lid and is arranged below the trunk lid, or the lower part of a split tailgate. To make comfortable access to the intermediate space possible, the tailgate can be mounted pivotably at the vertical level of the intermediate space floor, whether via pivot pins, a pivot rod, or via multiple-element and/or multiple-axis joints. Accordingly, said pivot axis does not have to be a continuous axle beam.

Furthermore, the rear module according to exemplary aspects of the present disclosure includes a frame element that extends transversely with respect to the vehicle longitudinal direction and is integrated into the tailgate. In relation to the prior art, the single-piece, rear-side vehicle frame is modified by way of the example of this disclosure in such a way that the lower frame side is replaced by way of the frame element which is integrated into the tailgate. Accordingly, the frame element is also pivoted or moved in the case of opening or closing of the tailgate. In particular, the tailgate according to exemplary aspects of the present disclosure includes the frame element which is integrated therein and experiences a combined translational/pivoting movement.

In the case of a corresponding configuration, said tailgate makes simple accessibility possible of an intermediate space which lies below the trunk floor in relation to the vertical level, in the case of loading or unloading. The lower side of the rear-side vehicle frame can therefore be pivoted. It is to be ensured here that the minimum stiffness of the vehicle frame is maintained. This is to be taken into consideration in the case of the design and/or development of the vehicle. Furthermore, a replacement of the frame element in the case of damage (for example, as a consequence of an impact load applied to a vehicle) is facilitated by way of the releasable connecting capability of the frame element to the rear-side vehicle frame. The tailgate can be configured as a sole tailgate which closes the rear opening. In particular, for purposes of this disclosure, however, a tailgate is to be understood to mean the lower tailgate of a tailgate of split configuration. A trunk lid can also be provided in addition to the tailgate.

To ensure secure positioning of the rear module in a closed state of the tailgate, it is provided that the frame element has a first fastening assembly at its respective ends, the first fastening assembly being set up to provide a locking action of the rear module in a closed state of the tailgate, together with second fastening assembly which are configured on the rear-side vehicle body. A locking action of this type ensures that, in the case of an impact load applied to the vehicle (for example, an impact load applied to a rear end of the vehicle), the frame element has enough mechanical stability, to dissipate forces that act on the vehicle rear to the vehicle body. The first and second fastening assembly therefore together provide a locking action and interact directly in the process.

It can be provided here that the frame element and the first fastening assembly are configured in one piece, and the frame element is provided with the first fastening assembly during the production, for example during casting of the frame element. Subsequent arranging of the first fastening assembly on the frame element is also conceivable, for example by way of welding or some other type of integral forming. In an analogous manner with respect to this, it can be provided that the second fastening assembly and the rear-side vehicle body are configured in one piece. That is to say, the rear-side vehicle body is provided with the second fastening assembly during the production. It is also conceivable that the rear-side vehicle body comprises a plurality of components which are fastened to one another, and individual components of the rear-side vehicle body are provided with the second fastening assembly. This can mean a single-piece integral formation on the respective components, for example during a casting process. As an alternative, it can be provided, furthermore, that the second fastening assembly are subsequently arranged on the rear-side vehicle body or on individual components of the rear-side vehicle body, for example by way of welding or screwing. The above-described locking action can be triggered via a suitable actuating mechanism.

It can be provided in an exemplary embodiment of the present disclosure that the first fastening assembly are of corresponding configuration with respect to the second fastening assembly. Here, "corresponding" for purposes of this disclosure means, in particular, that the first fastening assembly and the second fastening assembly are configured or formed in such a way that they can be connected to one another in a positively locking (that is to say, fitting) manner. A refinement of this type of the first and second fastening assembly ensures a particularly secure and simple locking action of the rear module. It can be provided here that the first fastening assembly are bearing bushings which are configured on the frame element, and that the second fastening assembly are cylindrical bearing studs which are configured on the vehicle body. The bearing studs can take the form of journals. As an alternative to this, it can be provided that the first fastening assembly are cylindrical bearing studs (or journals) which are configured on the frame element, and that the second fastening assembly are bearing bushings which are configured on the vehicle body. It can particularly advantageously be provided that the respective bearing studs engage into the associated bearing bushings in the closed state of the tailgate, regardless of the specific arrangement position. The engagement can be ensured, for example, using a lock-and-key principle with ensuring of the fit.

It can be provided in an alternative refinement of the first and second fastening assembly that the first fastening assembly are hooks and the second fastening assembly are eyes, or the first fastening assembly are eyes and the second fastening assembly are hooks. A refinement in the form of interacting latching openings and latching elements can also be provided.

It can be provided in a further alternative refinement of the first and second fastening assembly that the first fastening assembly are permanent magnets and the second fastening assembly are electromagnets, and the rear-side vehicle body has a power supply unit for the power supply of the second fastening assembly, the power supply unit and the second fastening assembly being connected in an electrically conducting manner. There is advantageously a locking action of the rear module when the electromagnets are not supplied by way of the power supply unit, whereas the locking action is released as soon as current flows through the electromagnets. It is conceivable, furthermore, that the first fastening assembly are electromagnets and the second fastening assembly are permanent magnets, and the rear module has a power supply unit for the power supply of the first fastening assembly, the power supply unit and the first fastening assembly being connected in an electrically conducting manner. A locking action which is based purely on electromagnets or permanent magnets is also conceivable.

It can be provided in a further preferred refinement of the invention that the tailgate is subjected to a translational movement and a pivoting movement in the case of a movement from the closed state into an open state. This means that the tailgate has to be lifted or has to be moved to a higher vertical level before the tailgate can be pivoted. This additionally ensures the locking action of the rear module and prevents undesired pivoting of the tailgate. The lifting movement therefore corresponds first to a translational movement which subsequently merges into a pivoting or rotational movement. The tailgate is also subjected to a pivoting movement and a translational movement in the case of closing of the rear assembly, that is to say in the case of a movement from the open state into the closed state, said case being based on the reversed movement sequence in comparison with the opening movement. Therefore, a pivoting movement is first carried out, before the tailgate experiences a lowering movement (translational movement).

It can be provided in accordance with a further embodiment of the present disclosure that, furthermore, the rear module comprises a towbar and an associated interface assembly for the electric supply of a vehicle trailer. Here, the interface assembly can be connected to the on-board electronics system of the motor vehicle and/or to a vehicle battery. The towbar can be connected mechanically to the frame element. The towbar and the interface assembly are preferably integrated into the tailgate. Furthermore, the rear module can have an actuating mechanism, via which the tailgate can be opened and the locking action of the first and second fastening assembly can be released. To this end, an actuating system can be connected to a suitable unlocking mechanism of the first and second fastening elements, for example, via a Bowden cable. This can be implemented as it were in the form of a spindle drive, it being possible for the actuating element to be set up to actuate the spindle drive via a corresponding movement. The actuating element can be configured, for example, in the form of a manually actuatable handle.

It can be provided in accordance with a further exemplary aspect of the present disclosure that, in the closed state of the tailgate, the frame element configures a part of the rear-side vehicle frame and/or a bumper. Accordingly, the frame element can dissipate the forces which act on the vehicle rear to the vehicle body due to an impact load. That at is to say, the frame element serves to a certain extent as an energy absorption element or energy conducting element. It also provides a certain stiffness of the rear-side vehicle frame and/or the vehicle body. The frame element therefore configures a part of a rear-side bumper.

It can be provided in accordance with a further exemplary aspect of the present disclosure that, in its completely open position, the tailgate configures a loading ramp. The open position can be the pivoted-out position of the tailgate. Here, the loading ramp configures a connection between the vehicle interior (in the rear region) and a roadway surface. Via the loading ramp, cargo can be moved in a simple way into the stowage compartment or rear-side trunk and can be loaded. The ramp can consist of at least two ramp elements which can be displaced telescopically with respect to one another and which together configure a part of the tailgate or are integrated into the latter.

Because of the telescopic configuration, the loading ramp can be stowed or accommodated in the tailgate in a space-saving manner. Moreover, the length of the loading ramp is not restricted to the size of the tailgate, as a result of which a desired slope of the loading ramp in the folded-open state can be set in a flexible manner. To ensure the telescopic configuration, one of the ramp elements can have, for example, an inner cavity, in which a second ramp element can be received. The second ramp element does not have to have correspondingly smaller dimensions here. As an alternative, the tailgate can also have an inner cavity, in which at least one ramp can be stowed in the non-extended state. The ramp element can be extended in the course of a telescopic displacement movement with respect to the tailgate. The ramp elements can have locking elements, to avoid an undesired displacement of the ramp elements.

In accordance with a further exemplary aspect of the present disclosure, the ramp can comprise an apparatus for facilitated loading of loads. Apparatuses for facilitated loading can be, for example, guide elements which are configured on the ramp. A guide element can be understood to mean, for example, a rail arrangement, via which roller-based loads can be loaded or unloaded. In this context, a load can be understood to mean any desired cargo or transport container, for example suitcases, roller containers or transport boxes (this list is not definitive). Drawers or drawer systems can likewise also be understood as a load, however. They can be, for example, of rail-based or roller-based configuration.

A further exemplary aspect of the present disclosure can relate to the provision of an actuating mechanism, by virtue of which an opening movement of the rear module or tailgate can be initiated. The actuating mechanism can be triggered via a handle. An opening movement can be triggered via mechanical connecting members, joints, etc.; in particular, this can bring it about that the first and second fastening assembly are released from their locked position.

As has already been mentioned at the outset, the present disclosure is additionally directed to a motor vehicle with a rear module. A motor vehicle of this type fundamentally comprises a vehicle body which is configured in such a way that a hopper is arranged in the region of a rear-side vehicle trunk. The hopper is preferably arranged below a floor surface of the vehicle trunk. Here, the hopper has a hopper floor which, apart from a hopper side which faces the vehicle rear, is delimited completely by a wall with respect to the vehicle. On the rear side, the hopper floor terminates flush with the center section of the frame element, that is to say lies at a virtually identical vertical level. Here, the hopper can be integrated into the floor of the vehicle body or can provide a part of the vehicle body. By way of a refinement of this type, the trunk volume of the vehicle is increased substantially and loading operations are simplified.

In accordance with a further exemplary aspect of the present disclosure, the hopper can be fastened releasably to the vehicle body. To this end, fastening flanges which are angled away with respect to a side wall of the hopper can be provided in the upper region of the hopper in an angled-away manner, via which fastening flanges the hopper can be mounted on fastening regions which are provided on the vehicle side. The fastening flanges can have fastening openings or fastening assembly which interact with associated vehicle-side fastening openings or fastening assembly and can provide a fastening of the hopper to the vehicle. For example, the hopper can be screwed to the vehicle. The hopper can be replaced as required as a result of the releasable fastening thereof. Releasable fastenings fundamentally make considerably less expensive and more rapid repairs and/or a rapid replacement possible. The hopper can fundamentally be manufactured from plastic, metal or composite materials. The frame element is preferably manufactured from metal or a metal alloy.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

BRIEF DESCRIPTION OF THE FIGURES

Further advantages, configurations and further developments which are related to the modular tail assembly according to this disclosure or the motor vehicle according to the disclosure are explained in greater detail on the basis of the exemplary embodiments described below. The features described on the basis of the exemplary embodiments can also be called on for the further development of the modular tail assembly according to this disclosure and also the motor vehicle according to this disclosure. The exemplary embodiments are explained in greater detail on the basis of the following figures.

DETAILED DESCRIPTION

Figure 1:
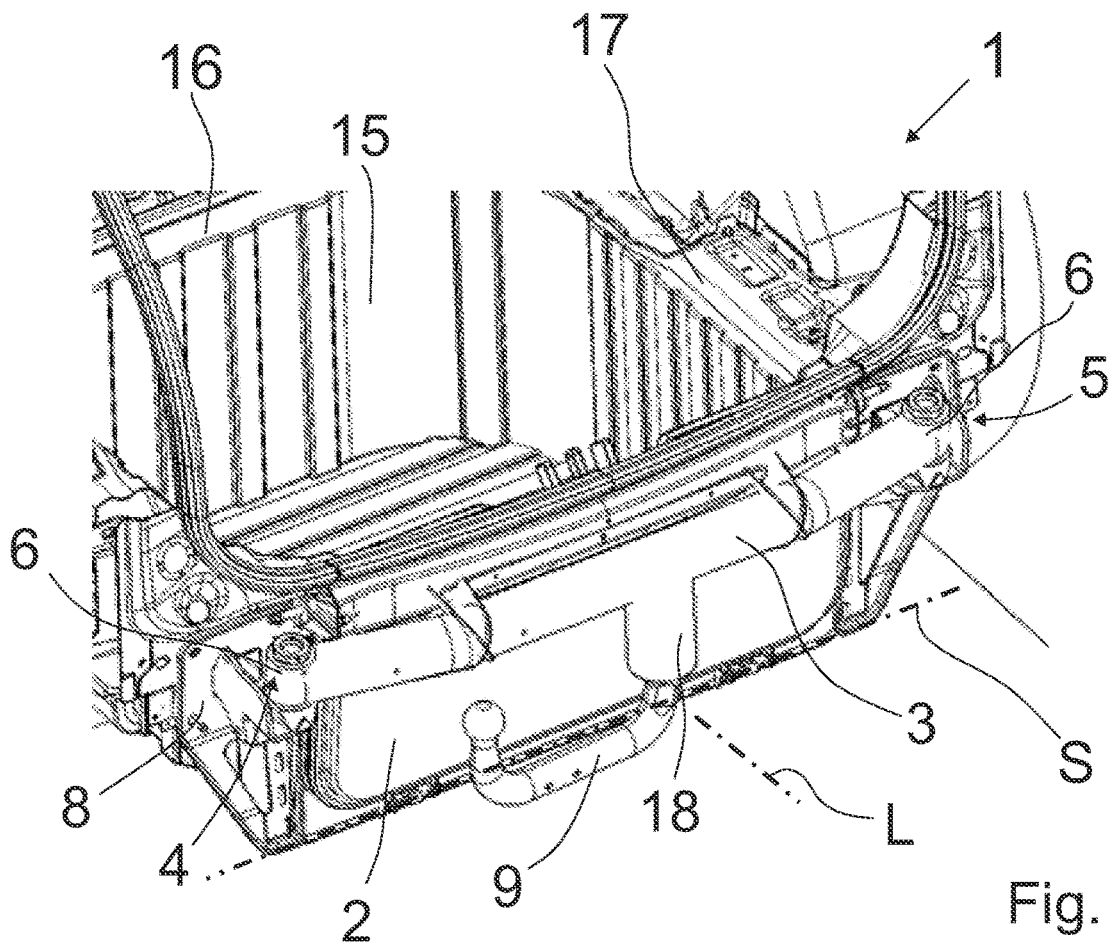
FIG. 1 shows a perspective view of a vehicle rear with the rear module according to an exemplary embodiment of the present disclosure with the rear module in a closed state.

Motor vehicles can have a loading opening (for example, a trunk opening) in the rear region. The loading opening can be delimited by a rigid rear-side vehicle frame. Here, a vehicle frame of this type is part of the vehicle body and is typically a single-piece component. The rear-side loading openings or trunk openings can be closed by a trunk lid. It is known here to use single-piece or two-piece tailgates, the tailgates as a rule being mounted pivotably on the vehicle frame.

With reference to FIGS. 1 to 5, a rear module according an exemplary aspect of the present disclosure includes a tailgate 2, which is configured such that it can be pivoted about a pivot axis S that extends transversely with respect to the vehicle longitudinal direction L. Furthermore, the rear module comprises a frame element 3 that extends transversely with respect to the vehicle longitudinal direction L and is integrated into the tailgate.

At respective ends 4, 5, the frame element 3 has a first fastening assembly 6. The first fastening assemblies 6 are set up to provide a locking action of the rear module together with second fastening assemblies 7, which are configured on the rear-side vehicle body 8, in a closed state of the tailgate 2 (this is illustrated, for example, in FIG. 1).

Rather than a single-piece, rear-side vehicle frame, the lower frame side is replaced by way of a separate frame element 3, which can be connected via suitable fastening assembly to the rear-side vehicle frame and/or the vehicle body 8.

As a result, simpler accessibility of an intermediate space 17, which lies below the trunk floor 16 (of a classic vehicle), in relation to the vertical level is made possible in the case of loading or unloading. The lower side of the rear-side vehicle frame can be, for example, lower when compared to other vehicle frame that do not include such a separate frame element. Furthermore, a replacement of the frame element 3 in the case of damage (for example, as a consequence of an impact load) is facilitated by way of the releasable connecting capability of the lower frame element 3 to the rear-side vehicle frame and/or the vehicle body 8. The loading opening is also increased in size when compared to a known motor vehicle of the same type.

FIG. 1 shows a perspective view of the rear region of a motor vehicle 1, in the case of which the rear module according to an exemplary aspect of the present disclosure is implemented. The tailgate 2 is not shown completely (only that part of the tailgate 2 which faces the vehicle interior or a hopper 15 which is provided there can be seen).

The frame element 3 is shown and it is attached at its ends 4, 5 via first fastening assembly 6 to the vehicle body 8. Here, the first fastening assembly 6 interacts with second fastening assembly 7, the latter fastening assembly 7 being provided on the vehicle body 8.

Figures 4A, 4B:
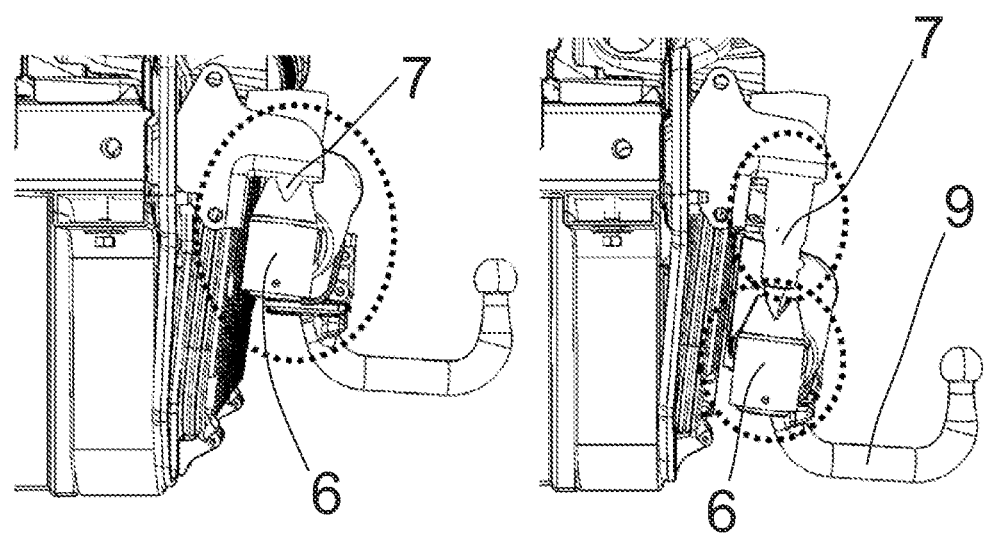
FIG. 4a shows a side view of the fastening assembly of FIG. 3 in a locked state.
FIG. 4b shows a side view of the fastening assembly of FIG. 3 in a non-locked state
Figure 5:
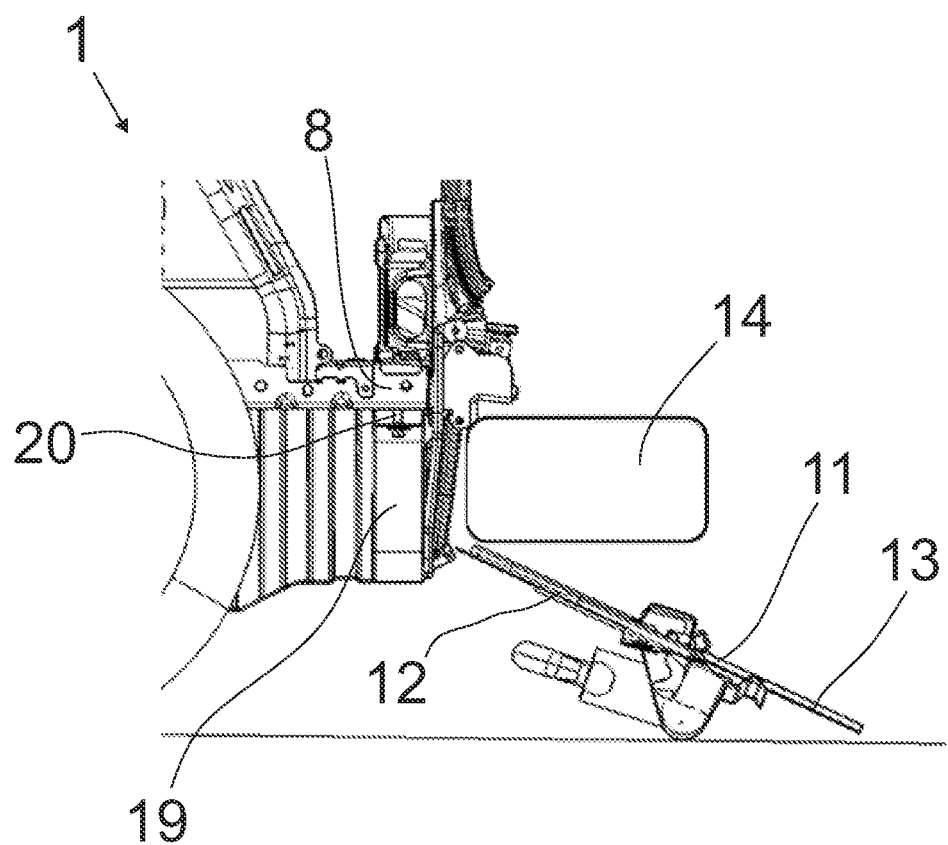
FIG. 5 shows a side view of a vehicle rear with the rear module in a completely open position with an extended loading ramp.

Furthermore, a towbar 9 is illustrated which can likewise be a constituent part of the rear module. The towbar 9 can be of a foldable configuration, that is to say it can assume a folded-in position (FIG. 1) or a folded-out position (FIGS. 4a and 4b).

A locking action can be triggered between the first and the second fastening assembly 6, 7 via an actuating mechanism which is not specified in greater detail or an actuating element. The towbar 9 can be connected via a mechanical connecting member 18 to the frame element 3.

Figure 2:
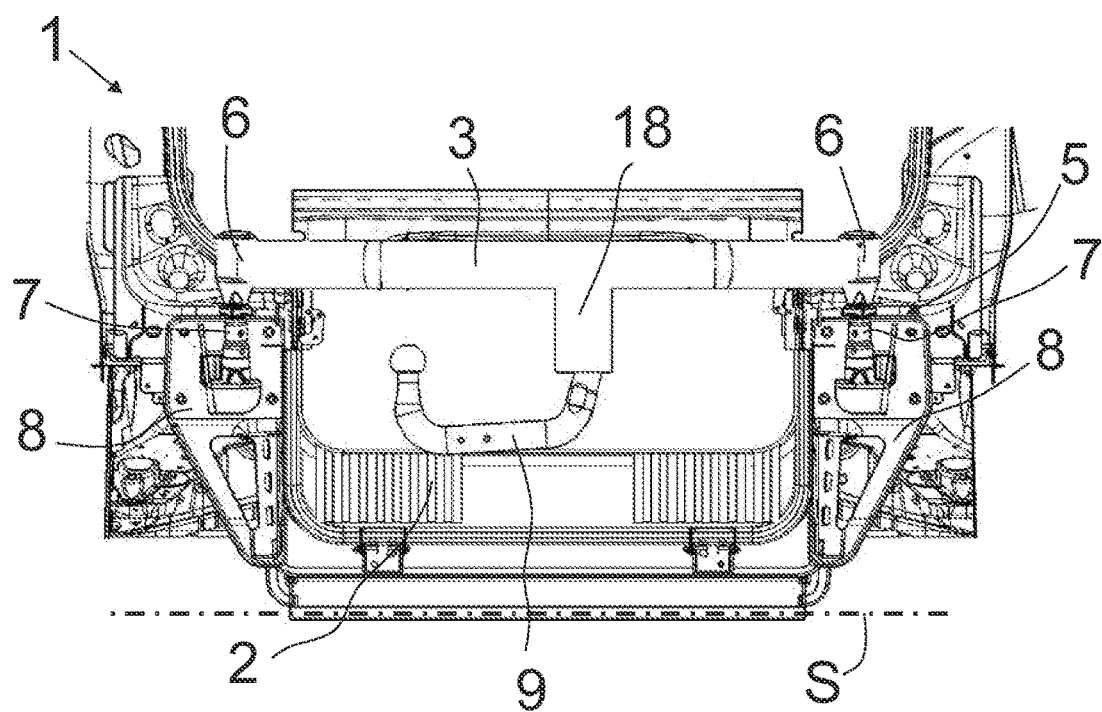
FIG. 2 shows a rear view of a vehicle rear with the rear module if FIG. 1 in the closed state and a fastening assembly being situated in a non-locked state.

The state shown in FIG. 1 of a closed tailgate or tail module is reproduced in FIG. 2 in a rear view of the rear of the motor vehicle 1. It is to be noted, however, that the first and the second fastening assembly 6, 7 are situated in a non-locked state in FIG. 2.

FIG. 2 shows a rear view of the rear module according to exemplary embodiment shown in FIG. 1. As shown, the tailgate 2 is not situated in its completely closed position. As has been mentioned at the outset, the tailgate 2 experiences a combined translational movement and pivoting movement in the case of opening and closing. In the case of opening, the tailgate 2 including the frame element 3 which is integrated therein is first of all pushed upward in a translational manner by a defined distance, namely until a locking action which is provided by the first fastening assembly 6 and the second fastening assembly 7 is triggered.

As FIG. 2 has already shown, the first fastening assembly 6 can assume the form of bearing bushings, whereas the second fastening assembly 7 are configured in the form of bearing studs or bearing journals. In every case, the first fastening assembly 6 and the second fastening assembly 7 are of corresponding configuration with respect to one another. That is to say they can engage into one another, for example, with an accurate fit. The bearing studs can readily also be configured on the frame element 3 and the bearing bushings can be configured on the vehicle body 8, cf. the illustrations according to FIGS. 3, 4*a*, and 4*b*. In the latter case, the tailgate 2 needs to be moved downward in the vertical direction in order to release the locking action which prevails between the fastening assembly 6, 7, before a pivoting movement can take place about the pivot axis S.

Figure 3:
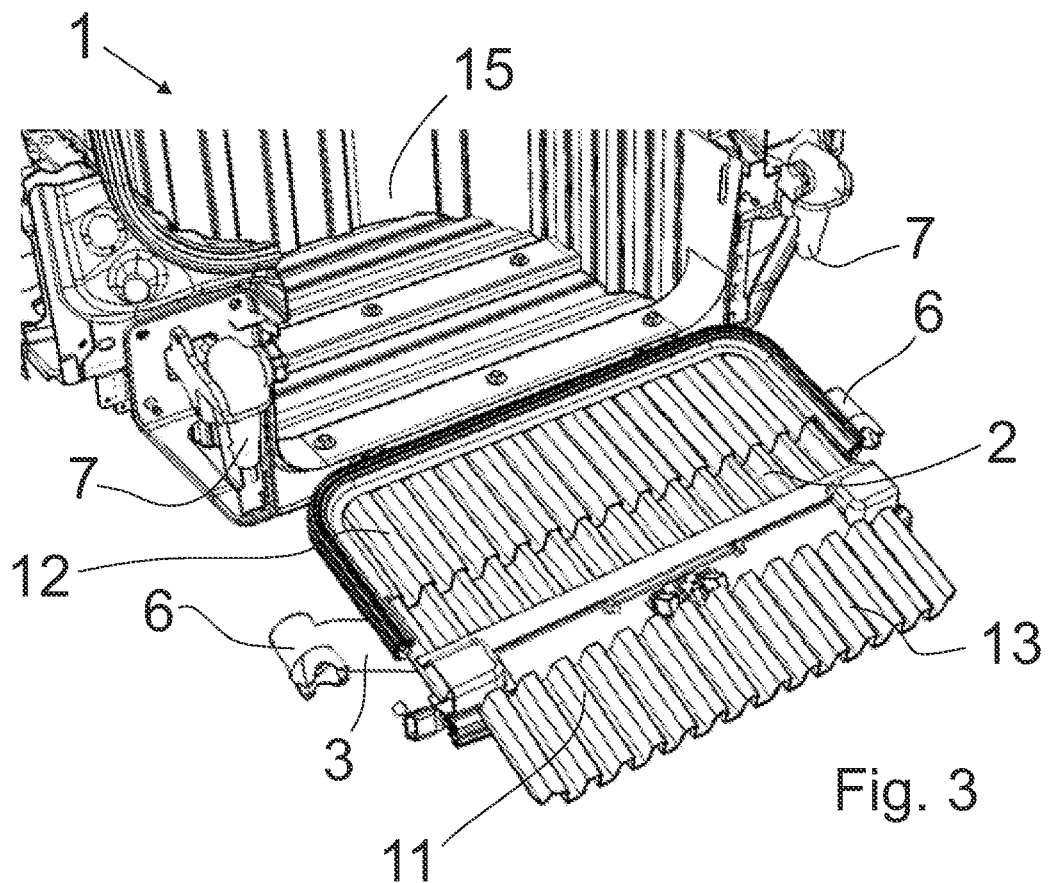
FIG. 3 shows a perspective view of a vehicle rear with the rear module of FIG. 1 in an open state and the fastening assembly having an alternative configuration from that of FIG. 2.

FIG. 3 reproduces the tailgate 2 or rear module in an open state. Here, the tailgate 2 can configure a loading ramp 11 which consists of two (or more) ramp elements 12, 13 which can be displaced telescopically with respect to one another (cf. also FIG. 5). The ramp elements 12, 13 can also be connected to one another in an articulated manner and can be pivotable relative to one another. The loading ramp 11 facilitates the loading of the vehicle interior with loads 14 in the region of the hopper 15 which is provided there. Loads 14 can be of any type, for example suitcases, roller-mounted systems or drawers. A rail-guided drawer system can also be implemented, for example, in the region of the loading ramp 11. Otherwise, the hopper 15 can be fastened via suitable tensioning elements 19 (for example, in a U-shape) to the vehicle body 8 (cf. FIG. 5). The connection of the tensioning elements 19 to the vehicle body can be provided via screw connections 20.

FIGS. 1 and 3 illustrate that the motor vehicle 1 has a hopper 15 in the rear-side region, which hopper 15 lies below the vertical level of a classic trunk floor. The rear module according to exemplary aspects of the present disclosure are therefore accompanied by a plurality of advantageous functions. First of all, the rear-side stowage space of the motor vehicle 1 is increased in size. The loading of the stowage space is likewise facilitated by way of the loading ramp 11.

Features of the disclosed examples make it possible that rear-side loading of a motor vehicle can be carried out more comfortably and rapidly, and the stowage space which is accessible for loading the motor vehicle is increased in size. Furthermore, rapid opening and closing of the rear module and secure locking thereof can be ensured.

Advantageous configurations and variants of the exemplary embodiments can be found in the claims below. The features set out individually in the claims can be combined with one another, in any technically useful manner and present other advantageous variant embodiments.

Further, the preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A rear module for a motor vehicle, the rear module comprising:

a tailgate configured to pivot about a pivot axis that extends transversely with respect to a vehicle longitudinal direction; and a frame element that extends transversely with respect to the vehicle longitudinal direction and is integrated into the tailgate, the frame element having a first fastening assembly at respective ends of the frame element, the first fastening assembly configured to engage with a second fastening assembly on a rear-side vehicle body to lock the rear module in a closed state of the tailgate, wherein the tailgate is subjected to a translational movement and a pivoting movement when transitioning from the closed state into an open state.

2. The rear module of claim 1, wherein the first fastening assembly is of a corresponding configuration with respect to the second fastening assembly.

3. The rear module of claim 1, wherein the first fastening assembly is a bearing bushing, and the second fastening assembly is a cylindrical bearing stud.

4. The rear module of claim 3, wherein the respective cylindrical bearing studs engage into the associated bearing bushings in the closed state of the tailgate.

5. The rear module of claim 1, wherein the first fastening assembly is a cylindrical bearing stud, and the second fastening assembly is a bearing bushing.

6. The rear module of claim 5, wherein the respective cylindrical bearing studs engage into the associated bearing bushings in the closed state of the tailgate.

7. The rear module of claim 1, characterized in that the tailgate is subjected to a pivoting movement and a translational movement when transitioning from the open state into the closed state.

8. The rear module of claim 1, further comprising a towbar and an associated interface assembly for the electric supply of a vehicle trailer.

9. The rear module of claim 1, wherein, the closed state of the tailgate, the frame element provides a part of the rear-side vehicle frame, a bumper of the motor vehicle, or both.

10. The rear module of claim 1, wherein, when the tailgate is in a completely open position, the tailgate provides a loading ramp.

11. The rear module of claim 10, wherein the tailgate includes at least two ramp elements that can be displaced telescopically with respect to one another.

12. The rear module of claim 10, wherein the loading ramp includes an apparatus for facilitated loading of loads.

13. The rear module of claim 10, wherein the loading ramp includes a rail-guided drawer system.

14. The rear module of claim 1, further comprising an actuating mechanism, wherein an opening movement of the rear module can be initiated by the actuating mechanism.

15. A motor vehicle having the rear module of claim 1, the motor vehicle having a vehicle body configured such that a hopper is arranged in the region of a rear-side vehicle trunk.

16. The motor vehicle of claim 15, wherein, when the tailgate is in a completely open position, the tailgate provides a loading ramp, wherein the hopper is fastened releasably to the vehicle body.

17. The motor vehicle of claim 16, wherein the hopper is set up to be loaded via the loading ramp.

18. A rear module for a motor vehicle, the rear module comprising:

a tailgate configured to pivot about a pivot axis that extends transversely with respect to a vehicle longitudinal direction;

a frame element that extends transversely with respect to the vehicle longitudinal direction and is integrated into the tailgate, the frame element having a first fastening assembly at respective ends of the frame element, the first fastening assembly configured to engage with a second fastening assembly on a rear-side vehicle body to lock the rear module in a closed state of the tailgate,
wherein one of the first or second fastening assembly is a bearing bushing, and the other of the first or second fastening assembly is a cylindrical bearing stud.

* * * * *